United States Patent [19]
Katsuragi

[11] Patent Number: 4,651,166
[45] Date of Patent: Mar. 17, 1987

[54] TEMPERATURE CONTROL DEVICE FOR HEAD OF THERMAL PRINTER

[75] Inventor: Shigeru Katsuragi, Hiratsuka, Japan

[73] Assignee: Ricoh Company, Ltd., Tokyo, Japan

[21] Appl. No.: 862,047

[22] Filed: May 12, 1986

[30] Foreign Application Priority Data

May 10, 1985 [JP] Japan .................................. 60-98095

[51] Int. Cl.[4] .......................... G01D 15/10; B41J 3/20
[52] U.S. Cl. ................................ 346/76 PH; 400/120
[58] Field of Search .................... 346/76 PH; 400/120

[56] References Cited

U.S. PATENT DOCUMENTS 3,874,493 4/1975 Boyd .................................. 400/120
4,113,391 9/1978 Minowa .............................. 400/120
4,370,666 1/1983 Noda et al. .................... 346/76 PH

*Primary Examiner*—E. A. Goldberg
*Assistant Examiner*—Gerald E. Preston
*Attorney, Agent, or Firm*—Cooper, Dunham, Griffin & Moran

[57] ABSTRACT

In a thermal printer, a difference between an actual temperature of a head of the printer and a sensed temperature is compensated for to accurately control temperature of the head. A rate of variation in the temperature of the head which has occurred within a predetermined period of time is detected so that an overheat temperature of the head is set up according to the detected rate.

4 Claims, 6 Drawing Figures

TEMPERATURE CONTROL DEVICE FOR HEAD OF THERMAL PRINTER

BACKGROUND OF THE INVENTION

The present invention relates to a temperature control device for a head of a thermal printer which accurately controls the temperature of the head by compensating for a difference between an actual head temperature and a sensed head temperature.

The problem heretofore encountered with a thermal printer is that when the temperature of a head thereof undergoes a sharp change, it cannot be controlled with accuracy resulting in a decrease in the density of images to be printed out, a decrease in the service life of the head, and other undesirable occurrences. In light of this, it has been customary to protect the head by presetting a critical temperature level, or overheat level, of the head relatively low. This, however, causes the operation of the head and, therefore, that of the whole printer to be interrupted even when the head temperature has not been elevated to an actual overheat level. Conversely, should the overheat temperature of the head be designed relatively high, an elevation of the head temperature beyond the actual overheat level would fail to be detected to shorten the life of the head or even immediately break down the head.

SUMMARY OF THE INVENTION

It is therefore an object of the present invention to provide a temperature control device for a head of a thermal printer which copes with even substantial changes of head temperature without forcing the head operation to be interrupted and, therefore, without interrupting the printing function of the printer more than necessary or shortening the life of the head.

It is another object of the present invention to provide a generally improved temperature control device for a head of a thermal printer.

A device for controlling temperature of a head of a thermal printer by compensating for a difference between an actual temperature of the head and a sensed temperature of the present invention comprises a temperature sensing unit for sensing an actual temperature of the head to produce the actual temperature as first temperature data, and a temperature compensating unit for detecting a rate of variation of the first temperature data which has occurred within a predetermined period of time, compensating the first temperature data based on the detected rate, and producing the compensated first temperature data as second temperature data.

In accordance with the present invention, in a thermal printer, a difference between an actual temperature of a head of the printer and a sensed temperature is compensated for to accurately control temperature of the head. A rate of variation in the temperature of the head which has occurred within a predetermined period of time is detected so that an overheat temperature of the head is set up according to the detected rate.

The above and other objects, features and advantages of the present invention will become more apparent from the following detailed description taken with the accompanying drawings.

DESCRIPTION OF THE PREFERRED EMBODIMENT

While the temperature control device for a head of a thermal printer of the present invention is susceptible of numerous physical embodiments, depending upon the environment and requirements of use, a substantial number of the herein shown and described embodiment have been made, tested and used, and all have performed in an eminently satisfactory manner.

Figure 1:
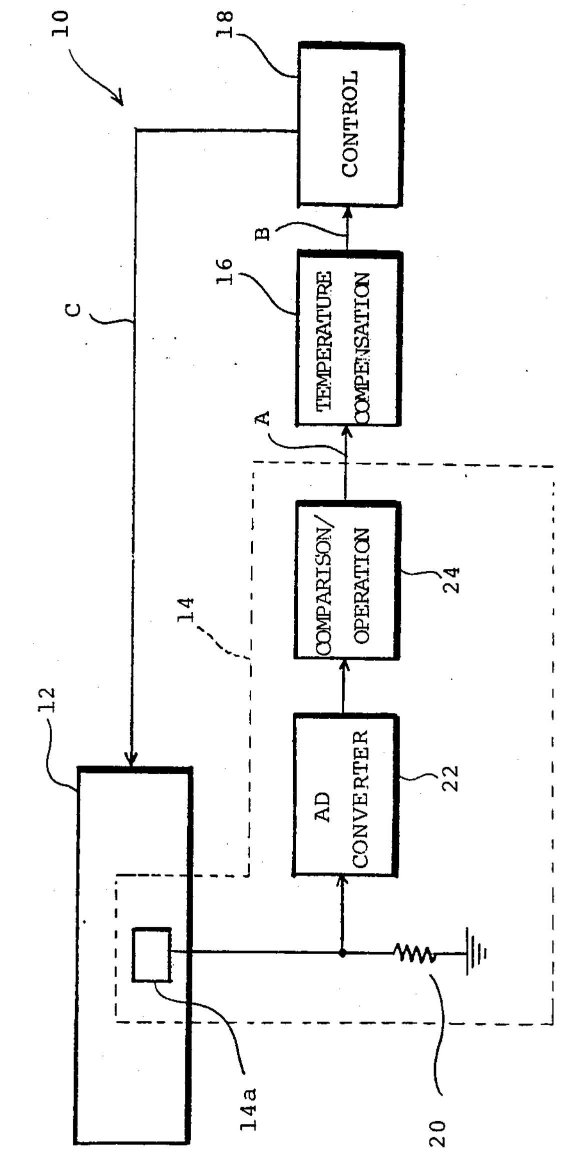
FIG. 1 is a block diagram of a temperature control device for a head of a thermal printer embodying the present invention.

Referring to FIG. 1 of the drawings, a temperature control device embodying the present invention is shown and generally designated by the reference numeral 10. The device 10 comprises a temperature sensing unit 14 sensitive to temperatures of a head 12, a temperature compensating unit 16, and a control unit 18. The temperature sensing unit 14 is made up of a temperature sensor 14*a* mounted on the head 12, a voltage dividing resistor 20, an analog-to-digital converter 22, and a comparison/operation circuit 24. An output signal of the unit 14 which is representative of first temperature data A is fed to the temperature compensating unit 16.

The unit 16 compares the instantaneous first temperature data A with temperature data A′ which has been delivered thereto a predetermined unit time before the data A so as to detect a rate of temperature change and, based on the detected rate, performs temperature compensation. That is, the unit 16 has the function of storing the temperature data A′ and the function of comparing the data A and A′. The output signal of the unit 16 is applied to the control unit 18 as second temperature data B. Supplies with outputs of various sensors (not shown) as well as the temperature of the head 12, the control unit 18 controls the head according to recording conditions of the printer and fluctuation thereof so that desirable images may be recorded. Particularly, as soon as the temperature of the head 12 reaches a predetermined overheat level, the unit 18 causes the head 12 to become inoperative. The head 12 prints out images on a paper (not shown) responsive to a control signal C which is applied thereto from the unit 18.

Figure 2:
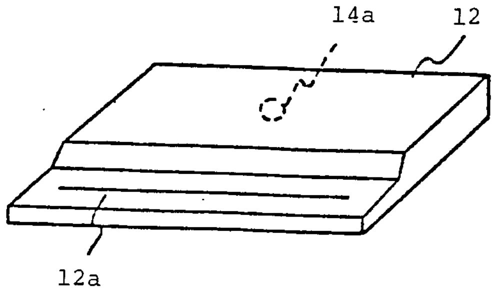
FIG. 2 is a perspective view showing a head of a thermal printer on which a thermistor or like temperature sensor is loaded.

As shown in FIG. 2, a thermistor or like temperature sensor 14*a* is mounted in the head 12. Because the temperature sensor 14*a* is spaced a substantial distance from a heat generating body 12*a* of the head 12 as illustrated, the temperature detection involves some time lag. Conversely, should the temperature sensor 14*a* be located in the vicinity of the heat generating body 12*a*, it would respond even to local temperature elevation (concentration of black pixels) rendering the control inaccurate.

Figure 3:
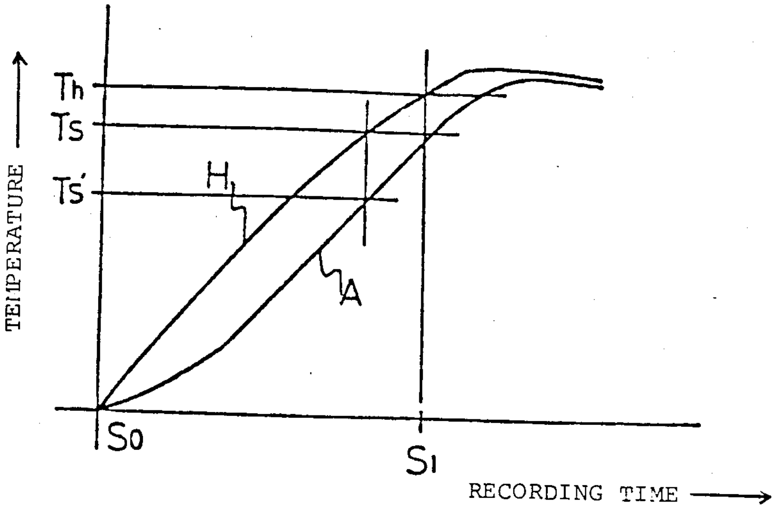
FIG. 3 shows curves representative of temperature variations which may occur in the device of FIG. 1.

Referring to FIG. 3, there are shown a curve H representative of actual temperature variation of the head 12, and a curve A representative of first temperature data A outputted by the temperature sensing unit 14.

The plot of FIG. 3 shows a case wherein a predetermined recording is performed over a period of time $S_0$ to $S_1$. As shown, the first temperature data A is varied at a rate slower than that of the actual temperature H of the head 12 and, therefore, controlling the head temperature based on the data A falls into inaccuracy. Assuming that the highest controllable temperature, or overheat temperature, of the head 12 is Ts as shown in FIG. 3, where the head temperature is compensated on the basis of the temperature data A, the actual temperature H of the head 12 will be elevated to the actual overheat level, Th, due to the delay particular to the sensed temperature. Such, as previously discussed, would shorten the life of the head 12 or even break down the head 12 immediately. While the overheat temperature level may be set at a value Ts' which is lower than Ts so as to cope with the above situation, such an overheat temperature is apt to cause the head 12 to be needlessly deactivated despite that the actual head temperature is lower than the overheat level, thereby making the whole printer inoperable.

In light of the above, the present invention contemplates to compensate temperature of the head 12 with the following principle.

Figure 4A:
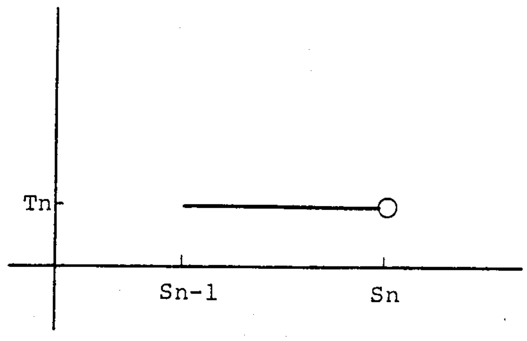
FIGS. 4A, 4B and 4C show the principle of temperature compensation in accordance with the present invention.
Figure 4B:
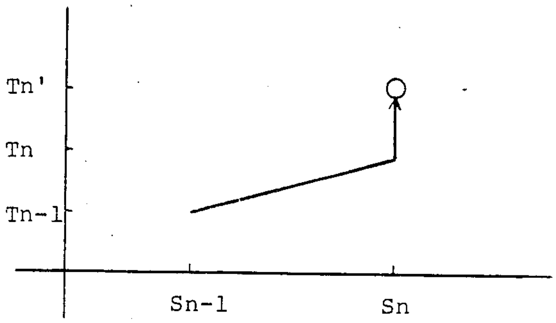
Figure 4C:
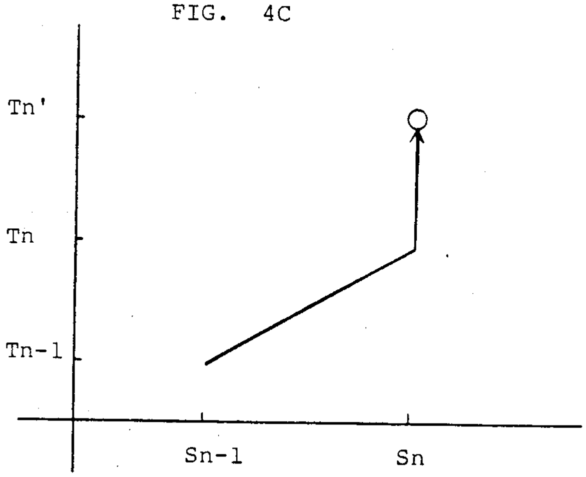

Referring to FIGS. 4A to 4C, graphs are shown which are representative of the principle particular to the present invention. In each of the graphs, a period of time $S_{\eta-1}$ to $S_\eta$ is a unit time, $T_\eta$ is the first temperature data at the time $S_\eta$, $T_{\eta-1}$ is the first temperature data appeared at the time $S_{\eta-1}$ which precedes the time $S_\eta$ by the unit time. In FIG. 4A, the data $T_\eta$ and the data $T_{\eta-1}$ are substantially equal to each other; the data $T_{72}$ is delivered as the second temperature data without being compensated. In FIG. 4B, the data $T_\eta$ and $T_{\eta-1}$ are slightly different from each other while, in FIG. 4C, they are noticeably different from each other. In the condition shown in FIG. 4B or 4C, the first temperature data $T_\eta$ is compared with the data $T_{\eta-1}$ which has occurred at the time $S_{\eta-1}$ and, then, the data $T_\eta$ is compensated according to the difference; in the illustrative example, the data $T_\eta$ is changed to data $T_\eta'$ by adding the difference to the data $T_\eta$. The new data $T_n'$ is fed from the unit 16 to the unit 18 as second temperature data.

Generally, the temperature of a thermal printer rises rapidly and drops slowly. It will be needless to mention that the present invention is applicable even to an image recording apparatus of the kind in which the rate of temperature drop should not be neglected.

In summary, it will be seen that in accordance with the present invention a head of a thermal printer can be accurately controlled in temperature and, thereby, prevented from overheating.

Various modifications will become possible for those skilled in the art after receiving the teachings of the present disclosure without departing from the scope thereof.

What is claimed is:

1. A device for controlling temperature of a head of a thermal printer by compensating for a difference between an actual temperature of the head and a sensed temperature, comprising:

temperature sensing means for sensing an actual temperature of the head to produce the actual temperature as first temperature data; and temperature compensating means for detecting a rate of variation of the first temperature data which has occurred within a predetermined period of time, compensating the first temperature data based on the detected rate, and producing the compensated first temperature data as second temperature data.

2. A device as claimed in claim 1, wherein the second temperature data is produced by adding to the first temperature data an amount of variation which has occurred during the predetermined period of time.

3. A device as claimed in claim 2, wherein the temperature compensating means comprises means for storing the first temperature data and means for comparing the first and the second temperature data to each other.

4. A device as claimed in claim 1, further comprising control means for generating a control signal to control the head responsive to the second temperature data.

* * * * *